(12) United States Patent
Nishihata et al.

(10) Patent No.: US 9,185,092 B2
(45) Date of Patent: Nov. 10, 2015

(54) CONFIDENTIAL COMMUNICATION METHOD USING VPN, SYSTEM THEREOF, PROGRAM THEREOF, AND RECORDING MEDIUM FOR THE PROGRAM

(76) Inventors: Akira Nishihata, Amagazaki (JP); Hiroshi Tanabe, Tokyo (JP)

( * ) Notice: Subject to any disclaimer, the term of this patent is extended or adjusted under 35 U.S.C. 154(b) by 415 days.

(21) Appl. No.: 13/634,054

(22) PCT Filed: Mar. 11, 2011

(86) PCT No.: PCT/JP2011/055844
§ 371 (c)(1),
(2), (4) Date: Nov. 26, 2012

(87) PCT Pub. No.: WO2011/111842
PCT Pub. Date: Sep. 15, 2011

(65) Prior Publication Data
US 2013/0074176 A1    Mar. 21, 2013

(30) Foreign Application Priority Data

Mar. 11, 2010 (JP) ................. 2010-055184

(51) Int. Cl.
*G06F 15/16* (2006.01)
*H04L 29/06* (2006.01)
*H04L 29/08* (2006.01)

(52) U.S. Cl.
CPC ............ *H04L 63/08* (2013.01); *H04L 63/0272* (2013.01); *H04L 67/104* (2013.01)

(58) Field of Classification Search
CPC . H04L 12/4633; H04L 12/4641; H04L 63/08; H04L 63/0272; H04L 67/104
USPC .................. 709/204, 228; 370/252, 352, 401
See application file for complete search history.

(56) References Cited

U.S. PATENT DOCUMENTS

| 7,353,252 B1 * | 4/2008 | Yang et al. .................... 709/204 |
| 2003/0095546 A1 | 5/2003 | Sakano et al. |

(Continued)

FOREIGN PATENT DOCUMENTS

| JP | 2001-177514 A | 6/2001 |
| JP | 2003-158553 A | 5/2003 |

(Continued)

OTHER PUBLICATIONS

Mikami et al., English translation of the title: "Development and evaluation of remote medical communication infrastructure system enabling secure user authorization using a portable phone," JTTA2008 in Gifu, Oct. 2008, pp. 1-2.

(Continued)

*Primary Examiner* — Quang N Nguyen
(74) *Attorney, Agent, or Firm* — Birch, Stewart, Kolasch & Birch, LLP

(57) ABSTRACT

In a confidential-communication system that uses a first-communication network that is Internet capable of confidential communication using VPN, and a second communication network that is an audio-circuit network, a method is implemented wherein a send/receive-processing portion 5 of a communication control device 3 completes authentication between users by implementing a P2P connection between each communication control device 3 by referencing specific information that specifies another party of a P2P connection in a memory portion 4 on the communication device 3 before confidential communication starts using VPN; a confidential-communication preparation portion 70 of the communication control device 3 exchanges via the second communication network VPN joint information required to establish a VPN link with the first communication network; and a switching portion 71 of the communication control device 3 starts confidential communication using VPN over a first-communication network.

10 Claims, 5 Drawing Sheets

(56) References Cited

U.S. PATENT DOCUMENTS

| | | | |
|---|---|---|---|
| 2006/0069914 A1 | 3/2006 | Rupp et al. | |
| 2009/0168787 A1* | 7/2009 | Ansari et al. | 370/401 |
| 2011/0044184 A1* | 2/2011 | Balasaygun et al. | 370/252 |
| 2011/0252151 A1* | 10/2011 | Lu et al. | 709/228 |
| 2012/0113977 A1* | 5/2012 | Shimoosawa et al. | 370/352 |

FOREIGN PATENT DOCUMENTS

| | | |
|---|---|---|
| JP | 2004-336444 A | 11/2004 |
| JP | 2006-217275 A | 8/2006 |
| JP | 2007-110387 A | 4/2007 |
| WO | WO 2005/018168 A1 | 2/2005 |

OTHER PUBLICATIONS

Yamada et al., English translation of the title: "A SIP 3pcc-signaling Method to Establish an on-demand VPN by Mobile Phone Operation," The Institute of Electronics, Information and Communication Engineers, IEICE Technical Report, Jul. 2008, pp. 29-34.

* cited by examiner

CONFIDENTIAL COMMUNICATION METHOD USING VPN, SYSTEM THEREOF, PROGRAM THEREOF, AND RECORDING MEDIUM FOR THE PROGRAM

TECHNICAL FIELD

The present invention relates to a confidential communication method using a VPN, a system thereof and a program thereof, and a recording medium for the program.

BACKGROUND ART

Since a physical leased line is expensive in spite of its superiority over a public network in security and quality of communication, a VPN (Virtual Private Network) has been widely used as a technique of constructing a virtual leased network on a public network.

In the present invention, the VPN refers to a technique of virtually realizing a leased line on a public network, which is a network shared by many unspecified users, by using a technique of warding off unauthorized access of third parties other than the intended users such as intrusion, wiretapping, interception, tampering, and spoofing.

That broadly-defined VPN includes the Internet VPN and the IP VPN.

Particularly the Internet VPN that uses the Internet for a transmission line has been rapidly widespread because it can be operated at a low cost and can be readily used in an Internet environment.

Hereinafter, the Internet VPN service that is currently widespread among the public will be referred to as the VPN service to distinguish it from the broadly-defined VPN.

Since the VPN service uses the Internet for the transmission line, it needs to manage authentication to detect a lack of authenticity of the VPN nodes and tampering with the VPN nodes between terminals in order to prevent unauthorized access of third parties other than the intended users such as wiretapping, tampering, or spoofing of the content of communications.

It also needs to encrypt packets by using an encryption key system and securely manage the key delivery to prevent leakage and tampering.

Now, typical methods of linking to the VPN service will be exemplified.

As a first method, a method of installing a VPN service program on a terminal of each user, first establishing communications among the terminals via specified global IP address information, then executing a VPN connection protocol can be considered.

In the first method, for specifying the destination's global IP address, a dynamic global IP address may be used through an external DNS (Domain Name System) service in addition to the way of setting a fixed global IP address to each terminal. In the first method, since end to end communication over the VPN service can be easily achieved but all of the exchange information required for the VPN link is transmitted through the Internet, the communication is vulnerable to an unauthorized access from outside. With user authentication and terminal authentication performed at the program level, this method is particularly vulnerable to spoofing attacks.

As a second method, a method of enhancing security by adding terminal authentication of each user can be considered. The second method is a method of first establishing communications among the terminals via specified global IP address information, then performing authentication to verify that the terminals are registered, and executing a VPN connection protocol.

The second method is a method of previously registering unique serial numbers of the terminals and crosschecking the numbers in establishing the VPN link to evaluate the authenticity of the VPN connection. Accordingly, the second method requires complicated work in managing registration and crosscheck of the unique serial number of each terminal and the like.

Since all the exchange information required for a VPN link is transmitted through the Internet also in this method as in the first method, the communication is vulnerable to unauthorized access from outside.

As a third method, a method of connecting the terminals of the respective users through carrier(s) that provide the external VPN service can be considered. The third method is a method of first connecting the terminals of the respective users with carrier(s) that provide the VPN service, then having the carrier(s) perform terminal authentication and user authentication and further perform acceptance of the destination information and a connection proxy service, and executing a VPN connection protocol.

In the third method, the user can use a VPN link securely and more easily than in the second method by previously installing a terminal registered with the carrier that is contracted with the user to provide the VPN service and establishing communication with the VPN service via the terminal to be subjected to terminal authentication and user authentication.

Since authentication of each terminal is individually performed by each carrier in the third method, exchange of destination information in connecting the terminals is simplified, therefore, the communication is less vulnerable to unauthorized access from outside than in the first and second methods.

However, the method requires the carriers which provide the VPN service to perform complicated setting of parameters and management for identifying and ensuring the VPN connection for each terminal, and the carriers in turn requires the user to bear the cost needed to maintain the service.

In addition, the use of the service will be limited in the area in which the environment for providing the VPN service is maintained by the carrier which provides the service.

Further, in view of the use of the VPN, techniques of delivering keys by using the Internet for a first network and using an audio circuit of fixed-line phone or mobile phone for a second network as disclosed in Patent Documents 1 and 2 have been proposed in order to enhance security and realize secure and fast key delivery between the VPN routers.

With the communication layered by using the second network of an audio circuit to deliver keys to be used in the confidential communication in the first network of a wide area network such as the Internet, secure and fast key delivery is expected.

PRIOR ART DOCUMENTS

Patent Documents

Patent Document 1: JP-A-2001-177514
Patent Document 2: JP-A-2006-217275

SUMMARY OF THE INVENTION

Problems to be Solved by the Invention

Although Patent Documents 1 and 2 describe networks multiplexed between communication terminals, they do not describe means for simplifying a method of specifying and authenticating each terminal.

That is, Patent Documents 1 and 2 describe techniques of using the second network to deliver keys to be used in the confidential communication, but the techniques do not solve the problems of the third method.

An object of the present invention is to solve the problems of the third method in constructing the VPN by allowing authentication and exchange of connection information only between the terminals to achieve a highly confidential communication environment without using the carrier which provides the external VPN service.

Solutions to the Problems

Each invention of the present application can realize secure confidential communication between the source that is an end user and the destination without using a carrier which provides an external VPN service.

The invention of the present application is configured as below with respect to a confidential-communication system using a VPN for performing a confidential communication between terminals of a plurality of users by authenticating the users before exchanging VPN connection information, the users using a wide area network such as the Internet.

That is, the system uses a first network that is the wide area network and a second network that is a wireless or wired P2P network. In the system, a communication control device is provided for the terminal of each of the users; the communication control device includes a memory portion for storing specific information which can specify another party of the P2P connection, a send/receive-processing portion, a confidential-communication preparation portion, and a switching portion; the send/receive-processing portion causes the P2P connection to be established between the respective communication control devices by referencing the specific information of the P2P connection in the memory portion before confidential communication using the VPN over the first network starts; the user authentication includes establishment of the P2P connection as an authentication factor; the confidential-communication preparation portion exchanges the VPN connection information between the communication control devices via the second network, the VPN connection information being required to establish a VPN link in the first network; and the switching portion starts the confidential communication using the VPN over the first network by a communication method based on the VPN connection information exchanged over the second network.

The system according to the present invention performs pre-negotiation for a VPN link via the second network before the confidential communication using the VPN over the first network starts.

The use of the second network after the negotiation is concluded via the second network includes not only immediately cutting off the second network but also using the second network concurrently with the first network during the VPN connection.

A protocol for constructing the VPN on the first network is, but not limited to, IP-sec in general.

When the IP-sec is used in the embodiment of the present invention, the information on the encryption key system to be used in the communication as well as the encryption key or the parameters for generating the encryption key are transmitted via the second network so that only the confidential communication using the encryption needs to be enabled via the first network, whereas when the IP-sec is not used, the encryption is previously communicated via the second network and the confidential communication over the first network may be enabled by means of any system other than encryption key systems. For example, data of the pre-negotiation for deciding the encryption may contain part of an encrypted message and the data may be sent and received via the second network, while the rest of the encrypted message may be sent and received via the first network so that, at the time of decoding, the both parts of the ciphertext will be matched for use.

The method for making the communication confidential is not limited to the encryption and any method other than the encryption may be used.

In this specification, the communication by means of speech communication includes a case where information is sent and received by the P2P (Peer to Peer) communication in the form of speech by a communication terminal, for example a portable terminal, and digital communication is established between the communication terminals.

The user authentication may be completed only via the second network or may be completed via both of the second network and the first network. In the case where the user authentication is completed only via the second network, the invention may be adapted to complete the user authentication on the condition that the P2P connection is established via the second network. Alternatively, the user authentication may be completed by exchanging via the second network the information other than that required for the P2P connection when the P2P connection is established. The information other than that required for the P2P connection may include information on access right authentication, for example.

The invention of the present application is configured as below with respect to the confidential-communication system using a VPN.

That is, when a call arrives from the source of the P2P connection via the second network, the confidential-communication preparation portion of the communication control device at the destination of the P2P connection references the memory portion of the communication control device via the send/receive-processing portion, and on the condition that the call matches the information on the source, i.e., the specific information, stored in the memory portion, responds to the call via the send/receive-processing portion, performs the exchange of the VPN connection information via the second network through the send/receive-processing portion, and prompts the communication control device at the source of the P2P connection to switch to the first network by the switching portion.

The invention of the present application is the confidential-communication system using a VPN wherein the VPN connection information includes a global IP address of each of the terminals to establish the VPN link.

The invention of the present application is configured as below with respect to the confidential-communication system using a VPN.

That is, in this system, the confidential communication uses an encryption key system, the VPN connection information includes information on the encryption key system to be used in the confidential communication, the specific information is a telephone number, the memory portion of the communication control device at the source of the P2P connection stores the telephone number of the source as well as the telephone number of the destination of the P2P connection, the send/receive-processing portion of each of the communication control devices includes a calling portion, an incoming call portion, a response detection portion, and a negotiation portion, the calling portion is for calling the destination of the telephone number stored in the memory portion via the second network by referencing the memory portion, the incoming call portion is for responding to an incoming call via the second network when the incoming call portion references the memory portion and detects a telephone number that matches the telephone number of the source of the incoming call, the response detection portion is for detecting via the second network that the destination responds to the incoming call, the negotiation portion is for sending or receiving via the second network the VPN connection information by the response from the destination, the calling portion of the source causes the P2P connection to be established from the source to the destination by referencing the memory portion and causing the telephone number of the destination in the memory portion to be called via the second network before the VPN link is established in the first network, the response detection portion of the source authenticates the destination by the response from the destination, and when a call arrives from the source via the second network, the incoming call portion of the destination references the memory portion of the destination, and on the condition that the call matches the telephone number of the source stored in the memory portion, authenticates the source, and after the authentication is completed by the source and the destination for each other, the confidential-communication preparation portion of the communication control device at each of the source and the destination causes the negotiation portion to exchange the VPN connection information via the second network and prompts the communication control device at the source to start the confidential communication by the switching portion via the first network.

The invention of the present application is the confidential-communication system using a VPN wherein the VPN connection information includes a parameter to be used in the confidential communication.

The invention of the present application is the confidential-communication system using a VPN wherein the communication control device includes a router portion for routing in the first network.

The invention of the present application provides a confidential communication device used as the communication control device in the confidential-communication system, wherein the device is configured as below.

That is, the device includes a wide area network interface, an voice communication network interface, the memory portion for storing the specific information, the send/receive-processing portion, the confidential-communication preparation portion, and the switching portion, wherein the wide area network interface is capable of connecting with the first network via a terminating device, the voice communication network interface is capable of connecting with the second network via a portable terminal, the send/receive-processing portion causes the P2P connection to be established between the respective communication control devices by referencing the specific information in the memory portion before confidential communication using a VPN via the first network starts, the user authentication including establishment of the P2P connection as an authentication factor, the confidential-communication preparation portion exchanges the VPN connection information between the communication control devices via the second network on the first network, and the switching portion starts the confidential communication using the VPN over the first network by a communication method based on the VPN connection information exchanged via the second network.

The invention of the present application is the confidential communication device using a VPN, including a router portion for routing in the first network, and a portable terminal that is attached to the voice communication network interface as well as the voice communication network interface.

The invention of the present application provides a confidential-communication method using a VPN for performing a confidential communication between terminals of a plurality of users who use a wide area network such as the Internet, wherein the method is adapted as below.

That is, the method includes: using a first network that is the wide area network and a second network that is a wireless or wired P2P network; providing a communication control device for the terminal of each of the users; using a communication control device including a memory portion for storing specific information which can specify another party of the P2P connection, a send/receive-processing portion, a confidential-communication preparation portion, and a switching portion for the communication control device; causing the send/receive-processing portion to establish the P2P connection between the respective communication control devices by causing the send/receive-processing portion to reference the specific information in the memory portion before confidential communication using the VPN over the first network starts, authentication of the user including establishment of the P2P connection as an authentication factor; causing the confidential-communication preparation portion to exchange the VPN connection information between the communication control devices via the second network, the VPN connection information being required to establish a VPN link in the first network; and causing the switching portion to start the confidential communication using the VPN over the first network by a communication method based on the VPN connection information exchanged via the second network.

The invention of the present application provides a confidential-communication program using a VPN for realizing a confidential communication between terminals of a plurality of users by authenticating the users before exchanging VPN connection information, the users using a wide area network such as the Internet, wherein the program is adapted as below.

That is, the program is for enabling the confidential communication by using a first network that is the wide area network and a second network that is a wireless or wired P2P network when the program is installed on the terminal of each of the users or a communication control device provided on the terminal, and for constructing a memory portion for storing specific information which can specify another party of the P2P connection, a send/receive-processing portion, a confidential-communication preparation portion, and a switching portion when the program is installed on the terminal of each of the users or the communication control device provided on the terminal, wherein the send/receive-processing portion causes the P2P connection to be established between the respective communication control devices by referencing the specific information before the confidential communication using the VPN over the first network starts, the user authentication includes establishment of the P2P connection as an authentication factor, the confidential-communication preparation portion exchanges the VPN connection information between the communication control devices via the second network, the VPN connection information being required to establish a VPN link in the first network, and the switching portion starts the confidential communication using the VPN over the first network by a communication method based on the VPN connection information exchanged over the second network.

The invention of the present application provides a recording medium that stores the confidential communication program using a VPN.

Effects of the Invention

The present invention ensures security of the confidential communication without requiring intervention of an administrator such as a carrier that provides the VPN service or an authentication server owned by the administrator.

Specifically,

1) The system uses an voice communication network, which is a typical connection-oriented communication, as the second network before the VPN link via the first network is established, uses a number specific to another party of the connection as an identifier, and adopts the receiving side's response to a call for a telephone call as authentication of another party of the connection.

2) Next, the system enables secure communication over a VPN by establishing a procedure to make confidential communication via the first network without requiring intervention of a server or an administrator of the server between entities on the link which uses the voice communication network as the second network.

This simplifies establishment and installment of the VPN system, thus, reduces the costs to be borne by the VPN users. As a secondary advantage, the system can be installed in any environment as far as it can use a wide area network and an voice communication network.

EMBODIMENTS OF THE INVENTION

Embodiments of the present invention will be described below with reference to the drawings.

Figure 1:
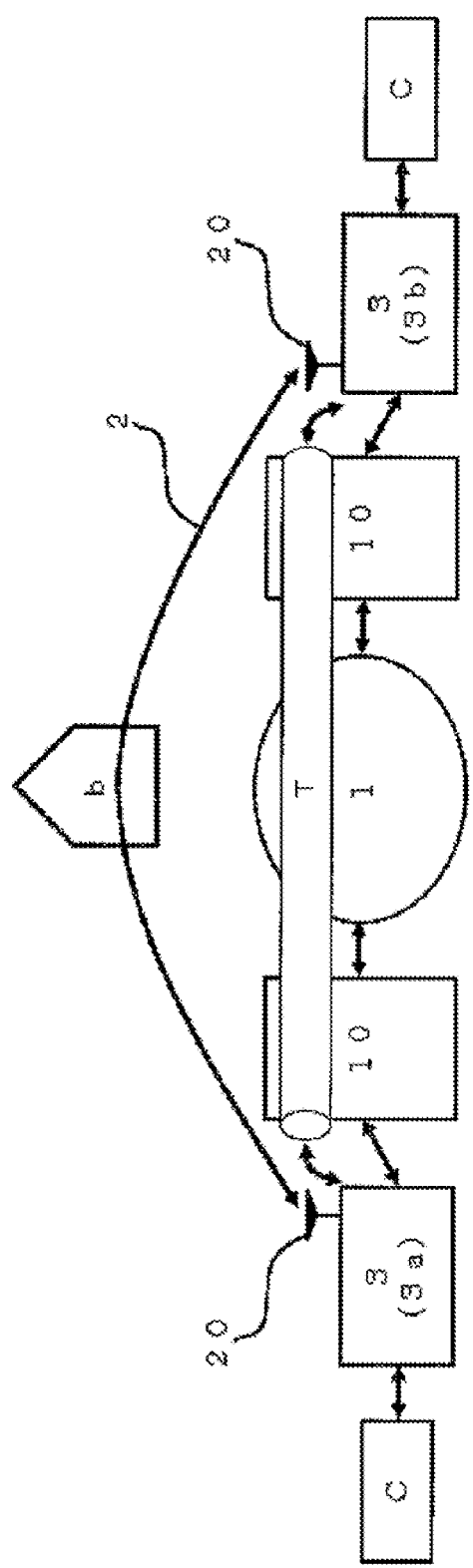
FIG. 1 is a diagram schematically illustrating a system according to the present invention.

As shown in FIG. 1, a confidential-communication system according to the present invention is constructed with two networks of a first network and a second network.

The first network 1 is a wide area network which can form a VPN among terminals. As shown in FIG. 1, the first network 1 is the Internet in the embodiment.

The second network 2 is a network that enables communication by a P2P (Peer to Peer) connection.

As the second network 2, the voice communication network for fixed telephones, mobile phones, IP phones which uses audio packets, and the like can be considered. Other than the voice communication network, the wireless audio communication which establishes the P2P connection can also be considered as the second network. However, the second network 2 does not include the communication using data packets such as web mail or IP data which cannot establish such a direct connection as the P2P connection.

As shown in FIG. 1, the second network 2 is the voice communication network of PHS (Personal Handy-phone System) in this embodiment.

In this embodiment, the VPN formed on the first network 1 is the Internet VPN which communicates by constructing a VPN tunnel T on the Internet in the IP-sec tunnel mode.

Now, items shown below will be described in order by assuming that each of VPN service users has the terminal of the first network 1.

1. Summary of the System
2. System Configuration
3. Flow of System Operation
4. Modifications
5. Conclusion 1. Summary of the System As shown in FIG. 1, a terminal of each user who takes part in the confidential communication on the first network 1 is a computer C in this embodiment. The computers C are connected with each other via terminating devices 10 and communication control devices 3 of the first network 1. The components are arranged in the order of the terminating device 10, the communication control device 3, and the computer C from the Internet side.

The communication control device 3 is also connected with a second network 2 via a portable terminal 20, which is a communication terminal of the second network 2, as shown in FIG. 1.

The communication control device 3 at the source of a P2P connection via the second network 2 will be referred to as the communication control device 3a, and the communication control device 3 at the destination of the P2P connection via the second network 2 will be referred to as the communication control device 3b below, as required.

In the above description, the communication control device 3a and the communication control device 3b are ready to start a P2P connection using the second network 2 over a switchboard b of a communication enterprise by the portable terminals 20 attached to the communication control devices 3 of the respective users.

First, the communication control device 3a references a known specific number held in the communication control device 3a, specifically, a telephone number of the portable terminal 20 of the destination held in the communication control device 3a, and calls the communication control device 3b via the portable terminal 20 attached to the communication control device 3a. In response to the arrival of the call at the portable terminal 20 attached to the communication control device 3b, the communication control device 3b compares the incoming call with a known specific number of the source held in the communication control device 3b, i.e., a known telephone number of the portable terminal 20 of the source held in the communication control device 3b, and only if it finds information indicating that the numbers match, it responds to the call. In this manner, the authentication between the communication control devices 3a and 3b is completed so that the authenticity is guaranteed.

The telephone number is the specific information described in the claims.

Next, the communication control devices 3a and 3b exchange information required for constructing a VPN tunnel T on the first network 1 by the P2P connection via the second network 2, such as an encryption method, an encryption key, and a global IP address. The access can also be restricted by having the information to be exchanged via the P2P connection contain an identifier such as a project name. The information required for constructing the VPN tunnel T is the VPN connectivity information described in the claims.

Based on the information required for constructing the VPN tunnel T, which is exchanged between the communication control devices 3, the VPN tunnel T is constructed on the first network 1 between the communication control device 3a and the communication control device 3b, and the confidential communication is started.

Therefore, the confidential communication via the VPN tunnel T is not performed until the communication control device 3b responds to the call from the portable terminal 20 attached to the communication control device 3a. This can prevent accidental connection by a third party. Since the method according to the present invention can be used as a technique for the terminal authentication, an administrative server or an administrator for the VPN service are not needed, therefore, a highly confidential communication environment can be achieved even in the area that is not prepared for providing the VPN service by a carrier.

Specifically, with the communication control device 3,
1) connection authentication of the communication control device,
2) authentication of the user's access right, and
3) exchanging the conditions for implementing the VPN link are performed in the second network 2 via the portable terminal 20. As a result of completion of 1) to 3), the VPN tunnel T is constructed on the Internet N, and
4) the confidential communication is implemented.

Since the present system does not use a wide area network for the connection authentication of the communication control device, authentication of the user's access right, and exchanging the conditions for implementing the VPN link as described above, it can realize an extremely highly confidential VPN system.

That is, in the system
a) the intended communication control devices 3 are linked by identifying the portable terminals 20 with the specific numbers of the respective portable terminals in authenticating the communication control devices 3 to establish the P2P connection via the second network 2. Therefore, in establishing the VPN link, the system does not need the terminal authentication by a carrier that provides an external VPN service.
b) the communication control devices 3 are configured to manage the global IP address information and exchange the information each other by the portable terminals 20 via the second network 2. Therefore, in establishing the VPN link, the system does not need the global IP address information to be managed by carriers that provide external VPN services.
c) the VPN link can be constructed only by using the communication control devices 3. Therefore, the system needs less troublesome management, as the system does not need to distinguish and manage carriers that provide external VPN services.
d) the communication control devices 3 are configured to exchange parameters to be used in the confidential communication each other via the portable terminals 20 without using the first network 1. Therefore, the system can use the common key cryptography the data of which is relatively small and which can pass the key fast but which is considered insecure, thus, avoided to pass the key in the tunnel mode of the VPN service.

In this system, AES can be used as the common key cryptography. The system can also use the other common key cryptography such as DES and Triple DES. Although it makes the data transmission slower, public key cryptography may be used, or public key cryptography may be concurrently used with common key cryptography.

After the communication via the VPN tunnel T is started, the confidential communication is performed according to a general IP-sec protocol.

2. System Configuration

As described above, this system has the computer C and the communication control device 3 as the communication terminal of each of the users who desire to communicate with each other by means of what uses the Internet VPN, which has a VPN tunnel T constructed on the first network 1 for communication, i.e., a VPN service.

In this embodiment, the communication control device 3 has a function of a router which performs routing control, and has the computer C located at the domain side. Further in this embodiment, the communication control device 3 has the portable terminal 20, i.e., PHS, attached to itself as a separate component from itself.

The users of this system start communication by operating the respective computers C, which are the terminals of the first network 1. In this embodiment, the users perform initialization before the system operation also by operating the computers C. The initialization at least includes causing the communication control device 3 to store the telephone number of the portable terminal 20 to be attached to the communication control device 3 and the identifier for identifying a confidential communication from another confidential communication, e.g., the project name, namely, storing the telephone number data and the project name data into the memory portion of the communication control device 3.

The computer C and the communication control device 3 constitute a functional unit, which is generally called a data station and performs all the functions required for delivering data to be transmitted, receiving the transmitted data, and communicating with another functional unit in a data link.

The communication control device 3 has functions of data terminal equipment which is generally called DTE. The DTE, forming part of the data station, functions as either or both of the data transmitting apparatus and the data receiving apparatus; in the present invention, functions as both of the data transmitting apparatus and the data receiving apparatus.

The terminating device 10 is data circuit-terminating equipment which is generally called DCE, and is a device located between the DTE and the transmission line at the data station for performing signal conversion and encoding.

The terminating device 10 is a modem which is connected to the first network. In the case where an optical line is used for the first network, however, an Optical Network Unit (ONU) may be used for the terminating device 10. Alternatively, a terminal adapter (TA) may be used for the terminating device 10.

The portable terminal 20 contains a modem (modulator-demodulator) (not shown) different from the terminating device 10. The modem contained in the portable terminal 20 enables communication via the second network 2.

The PHS uses an FSK modulation which represents binary of 1 and 0 by two carrier waves. That is, when the PHS is used for the portable terminal 20, the modem contained in the portable terminal 20 uses the FSK modulation.

(Communication Control Device 3)

In this embodiment, the communication control device 3 provided for the terminal of each user is a device installed separately from the computer C, which is a terminal, as described above.

The communication control device 3, which is a device provided with a central processing unit (hereinafter, referred to as a "CPU"), a storage represented by a ROM, a RAM, and a hard disk, and an input-output unit which enables network communication, has a confidential communication program written thereinto at the production process.

By the hardware and the confidential communication program cooperating with each other, the communication control device 3 is constructed as a communication control device having a memory portion 4, a send/receive-processing portion 5, a key processing portion 6, a confidential-communication preparation portion 70, a switching portion 71, an IP-sec processing portion 8, a router portion 9, a wide area network interface 100, and an voice communication network interface 200.

Each component of the communication control device 3 will be described in detail below with reference to FIG. 2.

(Memory Portion 4)

The memory portion 4, which is mainly constituted of the storage and the confidential communication program, has a destination specific number memory portion 41 for storing a destination specific number, a source specific number memory portion 42 for storing a specific number of itself which is the source, a destination global IP address memory portion 43 for storing a destination global IP address, a source global IP address memory portion 44 for storing a global IP address of itself which is the source, and a project name memory portion for storing an identifier of the access right. The respective memory portions 41 to 45 of the memory portion 4 are associated with each other so that the destination global IP address can be obtained from the destination telephone number stored in the memory portion 4, for example.

(Send/Receive-Processing Portion 5)

The send/receive-processing portion 5 is mainly constituted of the CPU, a storage, an input-output unit, and the confidential communication program.

The send/receive-processing portion 5 is for controlling the communication which uses the second network 2 via an voice communication network interface 200.

The send/receive-processing portion 5 of the communication control device 3a at the source of a P2P connection (caller side) calls the communication control device 3b at the destination via the second network 2.

When the call arrives, the communication control device 3b at the destination (receiver side) checks whether the telephone number of the other party of the incoming call matches a known telephone number of the source. That is, connection authentication for the P2P connection is performed at the receiver side.

When the incoming call from the source matches the telephone number of the source, i.e., after the completion of the connection authentication, the send/receive-processing portion 5 of the communication control device 3b at the destination responds to the source. The P2P connection is established by the response to the source.

The send/receive-processing portion 5 will be described in detail.

The send/receive-processing portion 5 has a calling portion 51 for calling via the portable terminal 20, an incoming call portion 52 for receiving the incoming call to the portable terminal 20, a response detection portion 53 for detecting a response to the call, and a negotiation portion 54 for exchanging necessary information after the connection is established between the respective portable terminals 20 of the communication control device 3a and the communication control device 3b.

The calling portion 51 is a dial portion for calling the destination of the specific number, i.e., the telephone number stored in the memory portion 4 via the second network 2 by referencing the memory portion.

The incoming call portion 52 responds to an incoming call via the second network 2 when it references the memory portion 4 and detects a telephone number that matches the telephone number of the source of the incoming call.

The response detection portion 53 detects via the second network 2 that the destination responds to the incoming call.

The negotiation portion 54, which is for sending or receiving by the response from the destination via the second network 2 the information and electronic data of the encryption key required for establishing the confidential communication via the first network 1, can send the data sent via the second network 2 to the confidential-communication preparation portion 70.

(Key Processing Portion 6)

The key processing portion 6, which is mainly constituted of the CPU, a storage, and the confidential communication program, has a key generation portion 61 for generating a key to be used in the confidential communication and a key holding portion 62 for holding a key to be used in decoding.

(Confidential-Communication Preparation Portion 70)

The confidential-communication preparation portion 70, which is mainly constituted of the CPU, a storage, and the confidential communication program, uses the second network 2 for preparing for the confidential communication via the first network 1.

After the completion of the connection authentication both at the destination and the source, the confidential-communication preparation portion 70 completes the access right authentication shown in FIG. 5 to be described later, subsequently exchanges the information and electronic data of the encryption key required for establishing the confidential communication via the first network 1, and prompts the communication control device 3 at the source to switch to the communication via the first network 1 by the switching portion.

In this embodiment, the user authentication is completed by the connection authentication via the P2P connection and the access right authentication.

(Switching Portion 71)

The switching portion 71, which is mainly constituted of the CPU and the confidential communication program, switches the communication by the confidential-communication preparation portion 70 via the portable terminal 20 to the communication by the IP-sec processing portion 8 via the first network 1.

The switching portion 71 also has a function of passing the information (data) required by the confidential-communication preparation portion 70 from the router portion 9 and the IP-sec processing portion 8 to the confidential-communication preparation portion 70.

The switching portion 71 also has a function of passing the information obtained by the confidential-communication preparation portion 70 to the IP-sec processing portion 8.

(IP-Sec Processing Portion 8)

The IP-sec processing portion 8, which is mainly constituted of the CPU, a storage, and the confidential communication program, controls the confidential communication via the first network 1.

(Router Portion 9)

The router portion 9, which is mainly constituted of the CPU, a storage, an input-output unit, and the confidential communication program, controls the communication path.

The router portion 9 can also be implemented as a router which is formed as a device separate from the communication control device 3 and is installed on the communication control device 3, instead of being contained in the communication control device 3 as a portion. In this case, the communication control program installed on the router needs not to be the confidential communication program according to the present invention but may be any program that implements general functions of the router including routing in cooperation with hardware.

This embodiment will be described on the assumption that the communication control device 3 has the router portion 9 as described above.

(Wide Area Network Interface 100)

The wide area network interface 100 is mainly constituted of the CPU, a storage, an input-output unit, and the confidential communication program. The wide area network interface 100 mediates the communication via the first network 1 through the terminating device 10.

In this embodiment, the wide area network interface 100 is a network adapter provided for the communication control device 3.

(Voice Communication Network Interface 200)

The voice communication network interface 200 is mainly constituted of the CPU, a storage, an input-output unit, and the confidential communication program. The voice communication network interface 200 mediates the communication via the second network 2 over the portable terminal 20.

The portable terminal 20, i.e., the PHS contains the modem which uses the FSK modulation as described above, and in this embodiment, the voice communication network interface 200 is a USB interface for detecting the modem in the PHS.

3. Flow of System Operation

Now, the communication method according to the present invention will be described.

This communication method is accomplished by an installation/setting process and an operation process after the installation/setting process.

The installation/setting process is a process for each of the users to perform initialization according to each environment. The installation/setting process only needs to be performed basically once at the time of installation only if the environment does not change. The operation process is automatically accomplished by the system.

Figure 2:
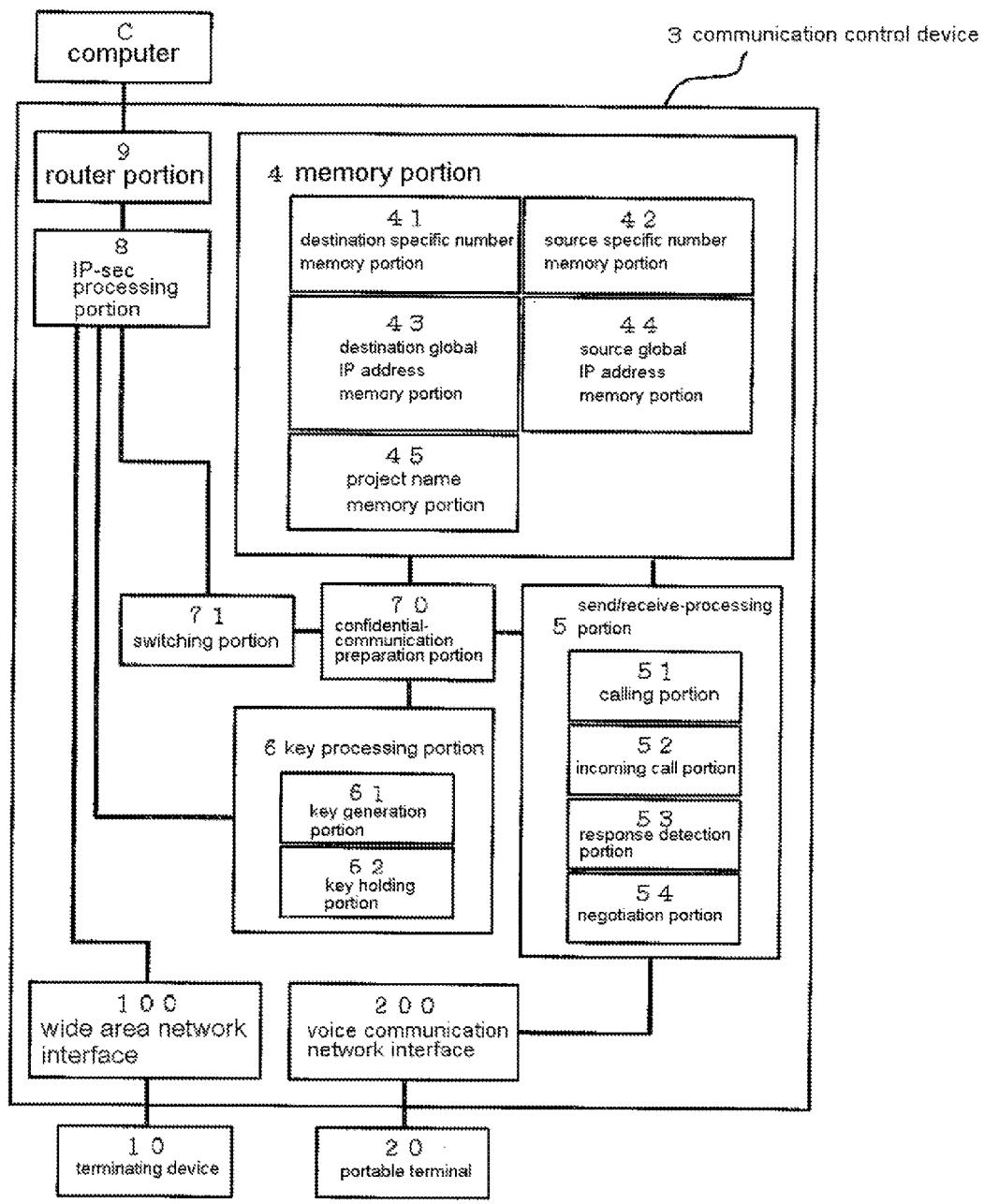
FIG. 2 is a diagram illustrating blocks of main part of FIG. 1.

First, in the installation/setting process, the user stores the specific number of the destination into the destination specific number memory portion 41 in the memory portion 4 of the communication control device 3 shown in FIG. 2, information on the specific number of the user into the source specific number memory portion 42, and information on the identifier of the access right, i.e., the project name into the project name memory portion 45, respectively.

Figure 3:
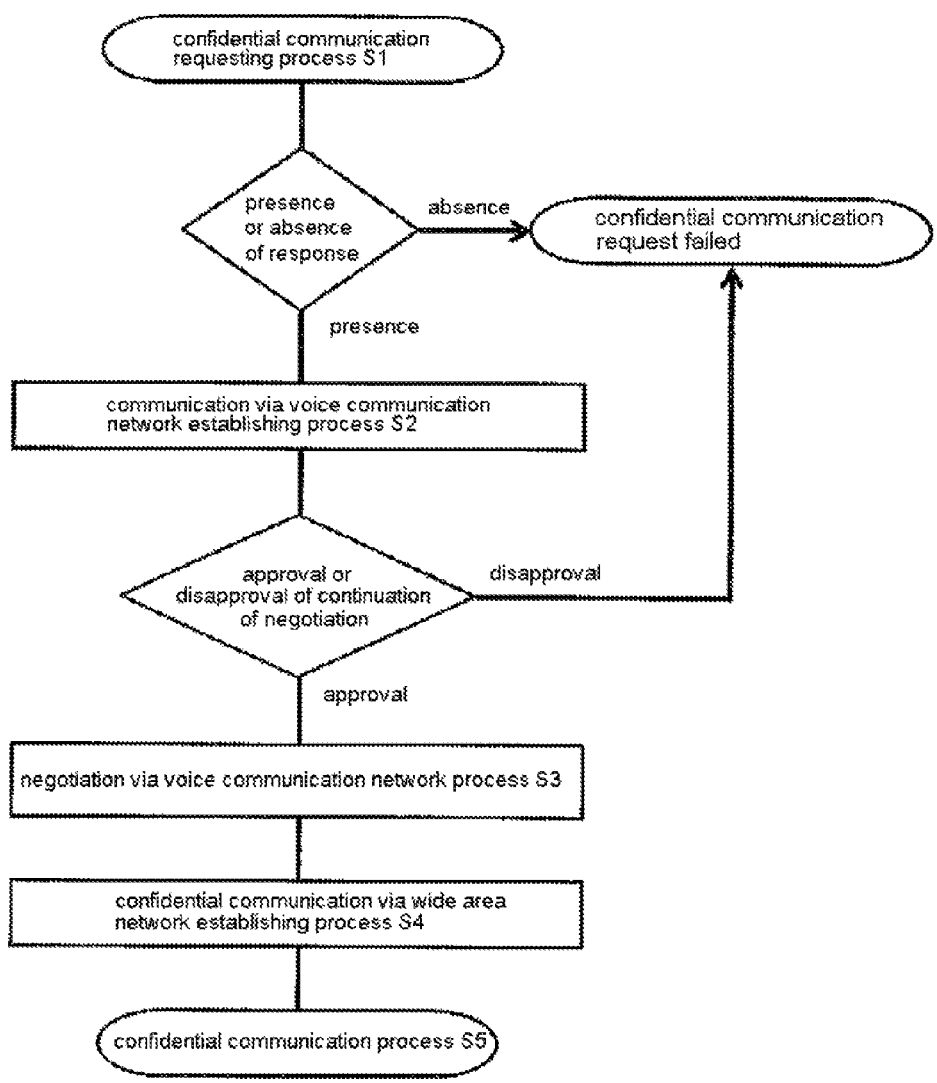
FIG. 3 is a diagram showing a source side flow of operating the system according to the present invention.

Next, processing at the source of the P2P connection performed in the operation process will be described. In the method of communication processing at the source of the P2P connection in the operation process, a confidential communication requesting process S1, a communication via voice communication network establishing process S2, a negotiation via voice communication network process S3, a confidential communication via wide area network establishing process S4, and a confidential communication process S5 are accomplished in order as shown in FIG. 3.

The processes will be described below with reference to FIG. 2 and FIG. 3.

(Confidential Communication Requesting Process S1)

When a communication packet is generated at the computer C at the left end of FIG. 1, which is a terminal, toward the communication control device 3b at the destination of the P2P connection, the router portion 9 of the communication control device 3a at the source instructs the switching portion 71 to start the confidential communication requesting process S1.

The switching portion 71 instructs the confidential-communication preparation portion 70 to accomplish from the confidential communication requesting process S1 to the negotiation via voice communication network process S3.

The router portion 9 suspends the communication packet to the communication control device 3b of the destination until the switching portion 71 enables the communication.

In the confidential communication requesting process S1, the confidential-communication preparation portion 70 of the communication control device 3a at the source of the P2P connection references the destination specific number memory portion 41 in the memory portion 4 of the communication control device 3a, and by using the calling portion 51 of the send/receive-processing portion 5 of the communication control device 3a, calls the portable terminal 20 of the communication control device 3b of the destination of the P2P connection via the portable terminal 20 through the voice communication network interface 200, i.e., causes the calling portion 51 to call the known telephone number of the destination.

To the call made by the calling portion 51, if the response detection portion 53 of the communication control device 3a at the source of the P2P connection has not detected a response from the communication control device 3b of the destination of the P2P connection after a predetermined elapsed time, the send/receive-processing portion 5 of the communication control device 3a at the source of the P2P connection finishes the processing by reason that the confidential communication request failed.

That is, as far as a response from the communication control device 3b is not received, the processing in and after the confidential communication requesting process S1 is not accomplished, and as a result, the confidential communication via the first network 1 through the wide area network interface 100 is not performed.

As for the case where a response is not received, the method can also be adapted to automatically repeat the call for a predetermined number of times, and if a response is not received yet after the call made by the predetermined number of times, finish the processing.

When the processing is to be finished, the facts that the confidential communication request failed or that the call was repeated may or may not be output to the computer C at the source side of the P2P connection shown at the left end of FIG. 1.

(Communication Via Voice Communication Network Establishing Process S2)

When a response from the communication control device 3b of the destination is detected, the response detection portion 53 of the communication control device 3a at the source of the P2P connection notifies the confidential-communication preparation portion 70 of the communication control device 3a that the communication via the second network 2 is established, i.e., that the P2P connection is established.

When the confidential-communication preparation portion 70 receives the notification, it first sends the identifier of the access right stored in the project name memory portion 45 in the memory portion 4 of the communication control device 3a to the communication control device 3b by using the negotiation portion 54 of the communication control device 3a to check whether it can continue with the negotiation via the second network 2 for constructing the VPN tunnel T on the Internet.

When the communication control device 3b at the destination of the P2P connection does not approve continuation of the negotiation via the second network 2 in response to the check, the processing is finished by reason that the confidential communication request failed.

That is, as far as the communication control device 3b at the destination does not approve continuation of the negotiation, the processing in and after the communication via voice communication network establishing process S2 is not accomplished, and as a result, the confidential communication via the first network 1 through the wide area network interface 100 is not performed.

When the processing is to be finished, the facts that the confidential communication request failed may or may not be output to the computer C at the source side of the P2P connection shown at the left end of FIG. 1, which is a terminal.

(Negotiation Via Voice Communication Network Process S3)

In the communication control device 3a at the source of the P2P connection, when the confidential-communication preparation portion 70 receives the notification of the establishment of communication from the response detection portion 53, the confidential-communication preparation portion 70 accomplishes the negotiation via voice communication network process S3 via the second network 2.

First, the confidential-communication preparation portion 70 of the communication control device 3a instructs the negotiation portion 54 of the communication control device 3a, then, the negotiation portion 54 performs the parameter exchange required to perform the communication by constructing the VPN tunnel T on the first network 1.

To describe specifically, the negotiation via voice communication network process S3 includes a global IP address exchange process and an IP-sec first phase protocol implementation process.

The global IP address exchange process of the negotiation via voice communication network S3 is a process of causing the communication control devices 3a, 3b at the source and the destination to securely exchange the respective global IP addresses on the first network 1 with each other via the second network 2.

On the condition that the destination authentication has been completed in the communication via voice communication network establishing process S2, the confidential-communication preparation portion 70 of the communication control device 3a obtains the global IP address of itself at the completion of the destination authentication from the router portion 9 of the communication control device 3a via the switching portion 71 of the communication control device 3a, and stores the global IP address in the source global IP address memory portion 44 in the memory portion 4 of the communication control device 3a.

Subsequently to the storage, the confidential-communication preparation portion 70 of the communication control device 3a instructs the negotiation portion 54 to notify the global IP address of itself prepared in the source global IP address memory portion 44 from the portable terminal 20 installed on the voice communication network interface 200 to the confidential-communication preparation portion 70 of the communication control device 3b at the destination via the second network 2.

After the notification, the confidential-communication preparation portion 70 of the communication control device 3a at the source obtains the destination global IP address from the negotiation portion 54 of the communication control device 3a of the source and stores the global IP address in the destination global IP address memory portion 43 in the memory portion 4 of the communication control device 3a of the source.

Subsequently to the storage, the confidential-communication preparation portion 70 of the communication control device 3a instructs the key processing portion 6 to generate and hold a shared key to be used in the IP-sec.

The key generation portion 61 in this embodiment uses the global IP addresses, telephone numbers of the mobile phones, the project name of both of the source and the destination as element information and automatically generates a pre-shared key to be used in a general IP-sec.

In the key generation processing, part of the element information shown in this embodiment or other element information which can be shared during the negotiation via voice communication network process S3 may be used.

The IP-sec first phase protocol implementation process which is performed subsequently to the key generation processing is for preparing the confidential communication information for a second phase of the IP-sec.

Now, a VPN construction procedure of a generally known IP-sec will be briefly described. The VPN construction procedure of a general IP-sec is constituted of a first phase, a second phase, and a confidential communication phase. Information exchanged in the first phase of the IP-sec roughly includes a confidential algorism for accomplishing the second phase, element information on encryption key, and information on authentication of fulfillment of both sides' communication conditions.

In the embodiment of the present invention, the second phase in which a protocol for deciding the confidential algorism and the encryption key for the confidential communication phase is performed is accomplished in the confidential communication via wide area network establishing process S4 to be described later.

However, arrangement of the functions of the first phase and the second phase of the IP-sec with respect to the negotiation via voice communication network process S3 and the confidential communication via wide area network establishing process S4 are not limited to that described above.

For example, the step of exchanging the information on authentication of fulfillment of both sides' communication conditions at the latter part of the first phase may be accomplished in the confidential communication via wide area network establishing process S4, i.e., may be performed via the first network 1, and the implementation of the protocol of the second phase may be accomplished in the negotiation via voice communication network process S3.

If the implementation of the protocol of the second phase is accomplished in the negotiation via voice communication network process S3, i.e., performed via the second network 2, it is meaningful in that the confidentiality can be maintained while the simplification of the IP-sec procedure can be considered.

In the negotiation via voice communication network process S3 in this embodiment, the confidential-communication preparation portion 70 instructs the negotiation portion 54 to implement the IP-sec first phase protocol.

The confidential-communication preparation portion 70 of the communication control device 3a passes the data including the confidential algorism and the element information of the encryption key obtained in the negotiation via voice communication network process S3 to the IP-sec processing portion 8 via the switching portion 71 as parameters for the VPN link.

The IP-sec processing portion 8 generates information on authentication of fulfillment of communication conditions by using the respective items of data in the information passed and the shared key in the key holding portion 62.

The confidential-communication preparation portion 70 obtains the information on authentication of fulfillment of communication conditions via the switching portion 71, exchanges the information on authentication of fulfillment of communication conditions with the destination via the negotiation portion 54, and completes the first phase of the IP-sec.

(Confidential Communication Via Wide Area Network Establishing Process S4)

After the completion of the two processes of the global IP address exchange process and the IP-sec first phase protocol implementation process in the negotiation via voice communication network process S3, the confidential-communication preparation portion 70 finishes the communication via the second network 2 by the portable terminal 20 through the voice communication network interface 200 performed by the send/receive-processing portion 5, and notifies the completion of the negotiation via voice communication network process S3 and the global IP address of the destination prepared in the destination global IP address memory portion 43 to the switching portion 71. That is, by this notification, the confidential-communication preparation portion 70 prompts the switching portion 71 to switch the communication to the communication via the first network 1.

Then, subsequently to the notification, the switching portion 71 notifies the IP-sec processing portion 8 of the global IP address of the destination and instructs the IP-sec processing portion 8 to accomplish the confidential communication via wide area network establishing process S4.

The IP-sec processing portion 8 accomplishes the process of deciding the confidential algorism and the encryption key for the second phase of the IP-sec, i.e., the confidential communication phase of the IP-sec by using the confidential algorism and the element information of the encryption key established in the negotiation via voice communication network process S3.

Although the communication by the portable terminal 20 via the voice communication network interface 200 is finished in the confidential communication establishing process S4 in this embodiment as described above, in preparation for another occurrence of the confidential communication requesting process S1 such as an abnormal termination of the confidential communication establishing process S4 or when it is desired to set the encryption key life short, the communication by the portable terminal 20 may be maintained as established.

(Confidential Communication Process S5)

When the confidential algorism and the encryption key for the confidential communication phase of the IP-sec are decided in the confidential communication via wide area network establishing process S4, the IP-sec processing portion 8 starts the confidential communication by the VPN tunnel T via the first network 1 through the wide area network interface 100.

After the confidential communication is started, the embodiment proceeds according to a known procedure of the IP-sec tunnel mode.

The switching portion 71 receives the notification of the establishment of the VPN tunnel T on the first network 1 from the confidential-communication preparation portion 70 and notifies the router portion 9 of approval of the communication with the communication control device 3b of the destination.

Hereinafter, the communication control device 3a and the communication control device 3b are enabled to perform the confidential communication via the VPN tunnel T.

Figure 4:
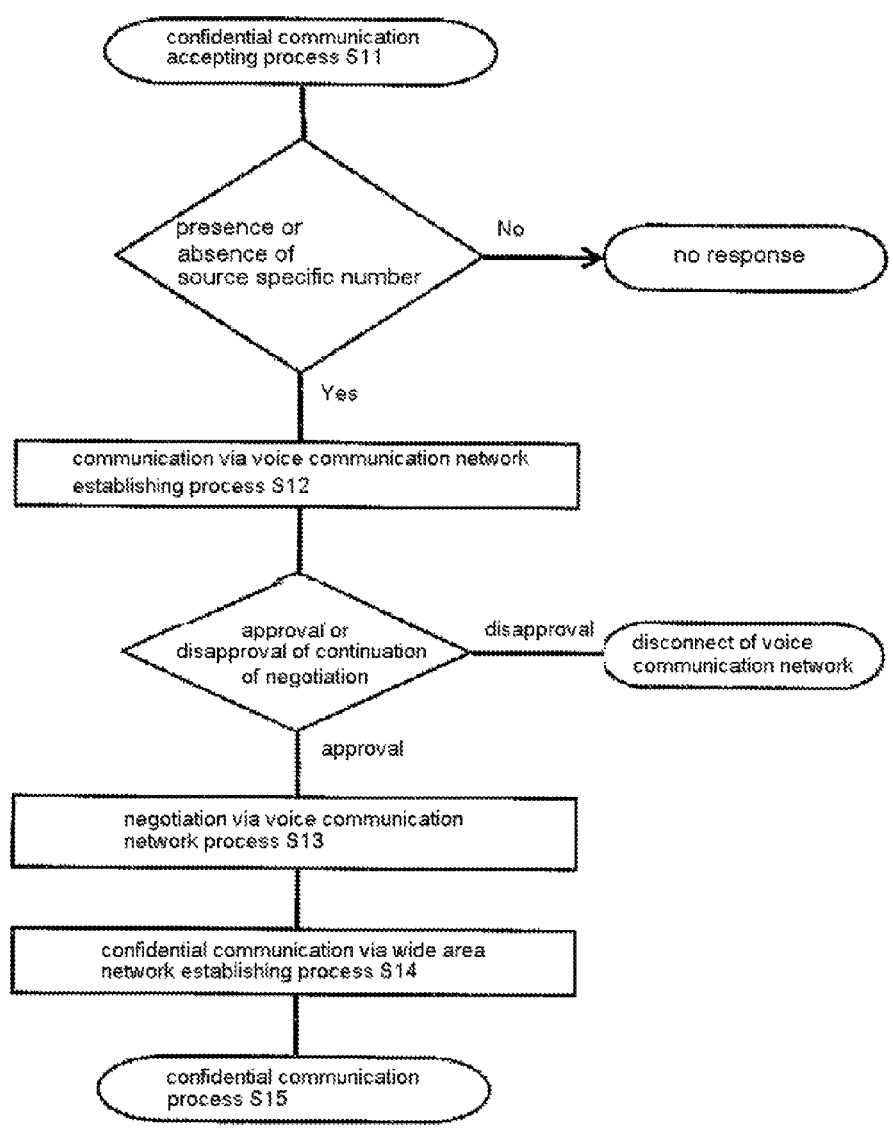
FIG. 4 is a diagram showing a destination side flow of operating the system according to the present invention.

Next, processing at the destination of the P2P connection performed in the operation process will be described. In the method of communication processing at the destination of the connection in the operation process, a confidential communication accepting process S11, a communication via voice communication network establishing process S12, a negotiation via voice communication network process S13, a confidential communication via wide area network establishing process S14, and a confidential communication process S15 are accomplished in order as shown in FIG. 4.

The processes will be described below with reference to FIG. 2 and FIG. 4.

(Confidential Communication Accepting Process S11)

When a call via the second network 2 arrives at the connected portable terminal 20, the incoming call portion 52 of the send/receive-processing portion 5 of the communication control device 3b at the destination of the P2P connection detects the call via the voice communication network interface 200 of the communication control device 3b, and subsequently, compares the specific number of the source of the incoming call with the specific numbers which are previously stored in the source specific number memory portion 42 in the memory portion 4 of the communication control device 3b.

If the specific numbers match as a result of the comparison, it responds to the call, and if not, it does not respond to the call.

That is, as far as the communication control device 3b does not respond to the incoming call to the communication control device 3b at the destination corresponding to the call from the communication control device 3a at the source, the processing in and after the confidential communication accepting process S11 is not accomplished, and as a result, the communication via the wide area network interface 100 of the communication control device 3b is not performed.

When a call from an unknown specific number arrives at the computer C of the destination side of the P2P connection shown at the right end of FIG. 1 and the processing is to be finished, the facts that the call is not responded to may or may not be output to the computer C.

(Communication Via Voice Communication Network Establishing Process S12)

The incoming call portion 52 of the communication control device 3b notifies the confidential-communication preparation portion 70 of the communication control device 3b that the incoming call arrived at the communication control device 3b corresponding to the call from the communication control device 3a of the source is responded to.

When the confidential-communication preparation portion 70 receives the notification, it uses the negotiation portion 54 of the communication control device 3b to compare the identifier of the access right sent from the communication control device 3a and check whether the identifier is previously stored in the project name memory portion 42 in the memory portion 4 of the communication control device 3b and associated with the specific number of the source.

If the project names do not match in the above process, the communication via the VPN is not started.

If the project names match as a result of the comparison, the negotiation portion 54 approves continuation of the negotiation performed via the second network 2, i.e., notifies the destination of continuation of the communication performed via the second network 2, and if the project names do not match, it rejects to continue the negotiation and disconnects the communication via the second network 2.

That is, as far as the communication control device 3b does not approve continuation of the negotiation, the processing in and after the process S12 is not accomplished, and as a result, the communication via the wide area network interface 100 is not performed.

When the processing is to be finished, the facts that the continuation of the negotiation via the second network 2 is rejected may or may not be output to the computer C of the destination side of the P2P connection shown at the right end of FIG. 1.

(Negotiation Via Voice Communication Network Process S13)

When the confidential-communication preparation portion of the communication control device 3b receives the notification of the establishment of communication from the response detection portion 53 of the communication control device 3b, the confidential-communication preparation portion 70 accomplishes the negotiation via voice communication network process S13 via the second network 2.

First, the confidential-communication preparation portion 70 of the communication control device 3b instructs the negotiation portion 54 of the communication control device 3b, then, the negotiation portion 54 performs the parameter exchange required to perform the communication by constructing the VPN tunnel T on the Internet N.

To describe specifically, the negotiation via voice communication network process S13 includes a global IP address exchange process and an IP-sec first phase protocol implementation process.

The negotiation via voice communication network process S13 at the destination is a process corresponding to the negotiation via voice communication network process S3 at the source. In the global IP address exchange process in the negotiation process S13, the global IP addresses on the Internet N of the communication control devices 3a, 3b at the source and the destination are securely exchanged with each other via the second network 2.

On the condition that the source authentication has been completed in the communication via voice communication network establishing process S12, the confidential-communication preparation portion 70 of the communication control device 3b obtains the global IP address of itself at the completion of the source authentication from the router portion 9 via the switching portion 71, and stores the global IP address in the source global IP address memory portion 44 in the memory portion 4 of the communication control device 3b.

Subsequently to the storage, the confidential-communication preparation portion 70 of the communication control device 3b instructs the negotiation portion 54 of the communication control device 3b to notify the global IP address of itself prepared in the source global IP address memory portion 44 of the communication control device 3b to the destination.

After the notification, the confidential-communication preparation portion 70 of the communication control device 3b obtains the destination global IP address from the negotiation portion 54 of the communication control device 3b and stores the global IP address in the destination global IP address memory portion 43.

Subsequently to the storage, the confidential-communication preparation portion 70 of the communication control device 3b instructs the key processing portion 6 to generate and hold a shared key to be used in the IP-sec.

Subsequently to the generation and holding of the shared key, the confidential-communication preparation portion 70 instructs the negotiation portion 54 to implement the IP-sec first phase protocol.

The confidential-communication preparation portion 70 of the communication control device 3b passes the data including the confidential algorism and the element information of the encryption key obtained in the negotiation via voice communication network process S13 to the IP-sec processing portion 8 via the switching portion 71 as parameters for the VPN link.

The IP-sec processing portion 8 generates information on authentication of fulfillment of communication conditions by using the respective items of data in the information passed and the shared key in the key holding portion 62.

The confidential-communication preparation portion 70 obtains the information on authentication of fulfillment of communication conditions via the switching portion 71, exchanges the information on authentication of fulfillment of communication conditions with the destination via the negotiation portion 54, and completes the first phase of the IP-sec.

(Confidential Communication Via Wide Area Network Establishing Process S14)

After the completion of the two processes of the global IP address exchange process and the IP-sec first phase protocol implementation process in the negotiation via voice communication network process S13, the confidential-communication preparation portion 70 of the communication control device 3b finishes the communication by the portable terminal 20 through the voice communication network interface 200 performed by the send/receive-processing portion 5, and notifies the completion of the negotiation via voice communication network process S13 and the global IP address of the destination prepared in the destination global IP address memory portion 43 to the switching portion 71 of the communication control device 3b.

Subsequently to the notification, the switching portion 71 of the communication control device 3b notifies the IP-sec processing portion 8 of the communication control device 3b about the global IP address of the destination and instructs the IP-sec processing portion 8 to accomplish the confidential communication via wide area network establishing process S14.

The IP-sec processing portion 8 accomplishes the process of deciding the confidential algorism and the encryption key for the second phase of the IP-sec, i.e., the confidential communication phase of the IP-sec by using the confidential algorism and the encryption key established in the negotiation via voice communication network process S13.

As the repetition of what mentioned in the above description about the confidential communication establishing process S4, although the communication by the portable terminal 20 via the voice communication network interface 200 is finished in the confidential communication establishing process S14 in this embodiment, in preparation for another occurrence of the confidential communication requesting process S11 such as an abnormal termination of the confidential communication establishing process S14 or when it is desired to set the encryption key life short, the method may be changed to maintain the communication by the portable terminal 20 as established.

(Confidential Communication Process S15)

When the confidential algorism and the encryption key for the confidential communication phase of the IP-sec are decided, the IP-sec processing portion 8 of the communication control device 3b, in conjunction with the communication control device 3a, starts the confidential communication by the VPN tunnel T on the first network 1 via the wide area network interface 100.

Also the switching portion 71 of the communication control device 3b receives the notification of the establishment of the VPN tunnel T on the first network 1 from the confidential-communication preparation portion 70 of the communication control device 3b and instructs the router portion 9 about approval of the communication with the communication control device 3a of the destination.

As described above, after the establishment of the VPN tunnel T, the communication control device 3a and the communication control device 3b are enabled to perform the confidential communication via the VPN tunnel T.

Figure 5:
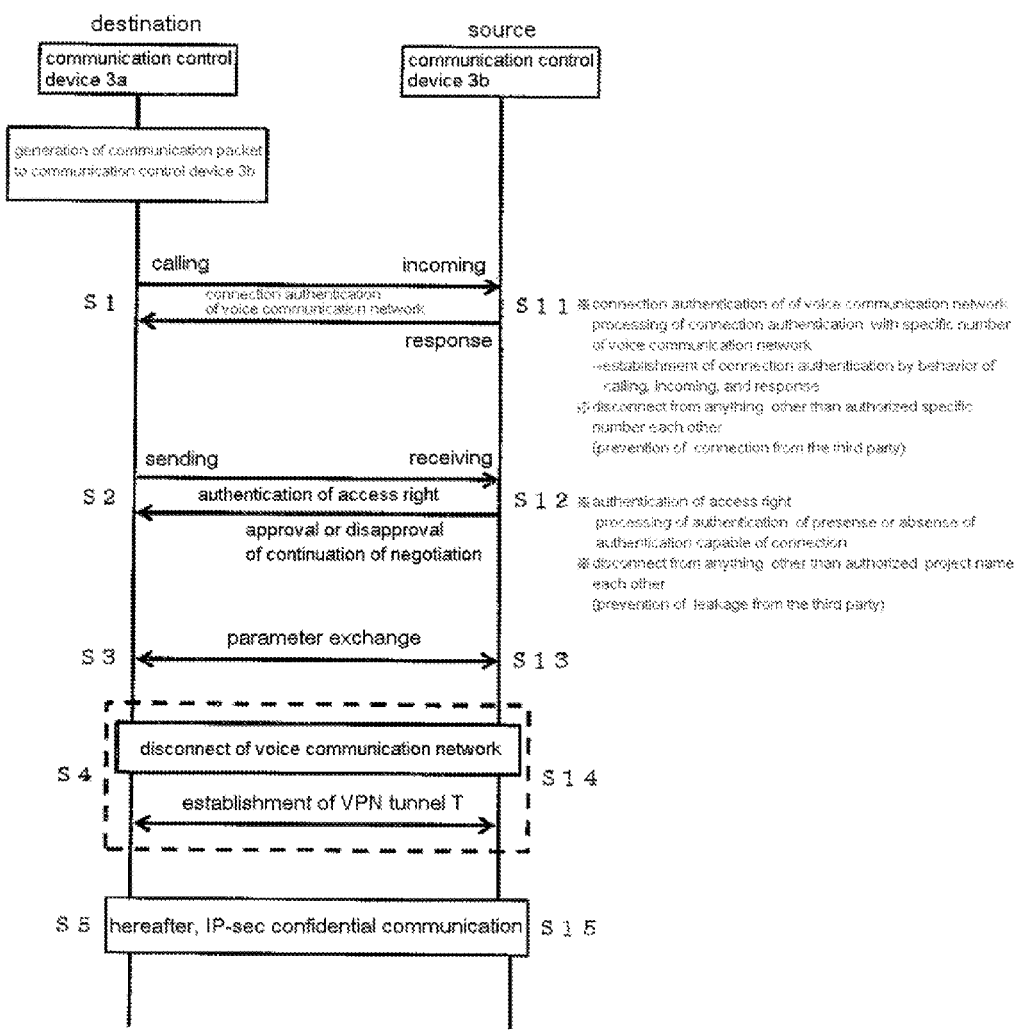
FIG. 5 is a diagram showing a sequence of operating the system according to the present invention.

The sequence between the communication control devices 3a and 3b is shown in FIG. 5.

Although it is possible to complete the authentication only by the specific number previously stored in the communication control device 3 in performing the negotiation via the second network 2 to construct the VPN tunnel T on the first network 1, in this example, the authentication is performed with the project name as the identifier of access right concurrently used in addition to the authentication by the specific number previously stored in the communication control devices 3a, 3b. It is preferable to use the authentication by the identifier of access right particularly to prevent spoofing.

Although it is possible to perform the authentication after the destination responds to the incoming call from the source in performing the authentication of the specific number, in this example, the authentication is performed before the response. It is preferable to perform the authentication before the response particularly to prevent connection by the third party.

4. Modifications

In the embodiments, when a communication packet directed to the communication control device 3b at the destination of the P2P connection is generated in the communication control device 3a at the source, the communication control device 3a starts the confidential communication requesting process S1 and the communication control device 3b starts the confidential communication accepting process S11, and when the authentication between the users is completed, the VPN tunnel T is constructed on the first network 1 after exchange in preparation for the confidential communication via the second network 2 is performed. The confidential communication requesting process S1 can be started also in response to the system start-up or according to the time schedule instead of by the generation of the communication packet, and can be implemented to construct the VPN tunnel T on the first network 1.

In addition, in the embodiment, if wrong information for specifying another party of the P2P connection, specifically a wrong telephone number, is input at initialization, thus, a wrong destination is called and, therefore, the wrong destination responds, the P2P connection established thereafter can be rejected by confirmation of the access right, for example, confirmation of the project name.

By assuming that the destination surely responds to the incoming call, the P2P connection established thereafter can be disconnected by the confirmation of the access right.

When the authentication between the users is completed by the information for specifying another party of the P2P connection, however, the connection can be implemented such that the confirmation of the access right by the confirmation of information, for example the project name, is not performed between the users.

Although the IP-sec tunnel mode is used in the embodiment, the present invention may be implemented in the IP-sec transport mode.

Although it is assumed that the VPN service is constituted of the IP-sec in the embodiment, the VPN service may be constituted of other communication systems without limited to the IP-sec.

For example, the present invention may be used such that part of data to be a tally is sent to the destination via the voice communication network and the rest of the data to be a tally is sent to the destination via the wide area network so that both parts of the data is matched at the destination to obtain the content of communication from the source.

The embodiment can be implemented such that each user installs a computer dedicated to initialization separately from the computer C which is the terminal illustrated in FIG. 1, and also can have input means such as a keyboard and display means for supporting the input such as a display provided for the communication control device 3 so that the user can perform the initialization on the communication control device 3.

Although the communication control device 3 which is formed as a device separate from the computer C which is to be a terminal for the Internet is attached to the computer C in the embodiment, the communication control device 3 needs not to be formed as a device separate from the computer C. For example, the present invention can also be implemented such that the confidential communication program according to the present invention is installed on the computer C to construct the communication control device 3 on the computer C. That is, the present invention can also be implemented such that the communication control device 3 is realized by the software installed on the computer C. In this case, the present invention can also be implemented such that the confidential communication program according to the present invention is installed on a computer which is separate from the computer C to construct the communication control device 3.

Also in this case, the present invention can be implemented such that, for the components which cannot be realized by software such as the router portion 9 and each interface portion of the communication control device 3, a device provided with only these functions is attached to a computer which functions as the communication control device 3.

Also in the embodiment illustrated in FIG. 1 and FIG. 2, the terminating device 10 can be implemented as incorporated in the communication control device 3, unlike that illustrated in the figures.

In the case where a PHS is used in the embodiments, it is also possible that a multichannel access function is used so that a first line of that is used for the wide area network, i.e., used for the first network 1, and a second line of that is used for the second network 2.

The embodiment may be implemented by using a machine specific number of the telephone set, a manufacturer's serial number or a MAC address held by the telephone set, other than the telephone number, as the specific numbers of the destination and the source of the P2P connection.

In the embodiment, a PHS is used. Like the caller ID display service for the fixed telephone, the PHS is for confirming both parties' telephone numbers between the users before the P2P connection is established. On the other hand, a fixed telephone which does not use the caller ID display service may be used in place of the portable terminal 20. In this case, the embodiment may be adapted such that the incoming call portion 52 of the destination references the memory portion 4 to confirm the telephone number of the source after the P2P connection is established. In this case, the access right authentication only needs to be performed after the authentication of the telephone number. Also in the case where a fixed telephone which does not use the caller ID display service is used, the matters which are not particularly specified are the same as the case of PHS.

In the case where the communication control device is a portable system, the communication control device may be implemented as a gateway router or the other LAN adapters, or may be implemented to be connected with or contained in a mobile device. In the case where the gateway router is used, the gateway router may be implemented as a portable device, i.e., a device made compact and light with a weight and size suitable to be carried, other than a stationary device.

The embodiment is adapted to complete the user authentication by the communication via the second network 2. Additionally, the embodiment may be implemented such that the user authentication is performed via the first network 1 together with the second network 2. That is, the embodiment may be implemented such that information required for the user authentication is exchanged via the first network 1 together with the second network 2.

In the case where the user authentication is completed by the communication via the second network 2, the user authentication may be completed only by P2P connection authentication or may be completed by the P2P connection authentication, the access right authentication, and authentication using the other information, other than the embodiment in which the user authentication is completed by the P2P connection authentication and the access right authentication.

5. Conclusion

The present invention needs neither a VPN server nor an administrator of the VPN server, because the present invention performs the P2P connection via the voice communication network to cause the both parties to authenticate each other, and then, causes the both parties to exchange the parameters required for establishing the confidential communication which uses the wide area network, establishes the VPN link by using the parameters before the confidential communication via the wide area network such as the Internet starts, and starts the confidential communication.

That is, when the present invention is applied,
1) the VPN is more easily installed, used, and managed, and
2) the VPN can be constructed and used at lower cost.
3) The VPN can be easily constructed across regions and countries as far as the places are prepared with a wide area network and voice communication network environment.

DESCRIPTION OF REFERENCE SIGNS

1 first network
2 second network
3 communication control device
10 terminating device
20 portable terminal

The invention claimed is:

1. A confidential-communication system using a Virtual Private Network (VPN) for performing a confidential communication between terminals of a plurality of users by authenticating the users before exchanging VPN connection information, the users using a wide area network such as the Internet, wherein
the system uses a first network that is the wide area network and a second network that is a wireless or wired Peer to Peer (P2P) network, wherein the second network is a voice communication network,
a communication control device is provided for the terminal of each of the users and configured to enable communication via the second network by using a modem,
the communication control device includes a memory portion for storing specific information which can specify another party of the P2P connection, a send/receive-processing portion, a confidential-communication preparation portion, and a switching portion,
the send/receive-processing portion causes the P2P connection to be established between the respective communication control devices by referencing the specific information of the P2P connection in the memory portion before confidential communication using the VPN over the first network starts,
the user authentication includes establishment of the P2P connection as an authentication factor,
the confidential-communication preparation portion exchanges the VPN connection information between the communication control devices by the P2P connection via the second network, the VPN connection information being required to establish a VPN link in the first network and including at least an encryption method, an encryption key, and a global IP address, and
the switching portion starts the confidential communication using the VPN over the first network by a communication method based on the VPN connection information exchanged over the second network.

2. The confidential-communication system using a VPN according to claim 1, wherein
when a call arrives from the source of the P2P connection via the second network, the confidential-communication preparation portion of the communication control device at the destination of the P2P connection references the memory portion of the communication control device via the send/receive-processing portion, and on the condition that the call matches the information on the source, i.e., the specific information, stored in the memory portion, responds to the call via the send/receive-processing portion, performs the exchange of the VPN connection information via the second network through the send/receive-processing portion, and
prompts the communication control device at the source of the P2P connection to start the confidential communication by the switching portion via the first network.

3. The confidential-communication system using a VPN according to claim 1, wherein
the VPN connection information includes the global IP address of each of the terminals to establish the VPN link.

4. The confidential-communication system using a VPN according to claim 1, wherein
the confidential communication uses an encryption key system,
the VPN connection information includes information on the encryption key system to be used in the confidential communication,
the specific information is a telephone number,
the memory portion of the communication control device at the source of the P2P connection stores the telephone number of the source as well as the telephone number of the destination of the P2P connection,
the send/receive-processing portion of each of the communication control devices includes a calling portion, an incoming call portion, a response detection portion, and a negotiation portion,
the calling portion is for calling the destination of the telephone number stored in the memory portion via the second network by referencing the memory portion,
the incoming call portion is for responding to an incoming call via the second network when the incoming call portion references the memory portion and detects a telephone number that matches the telephone number of the source of the incoming call,
the response detection portion is for detecting via the second network that the destination responds to the incoming call,
the negotiation portion is for sending or receiving via the second network the VPN connection information by the response from the destination,
the calling portion of the source causes the P2P connection to be established from the source to the destination by referencing the memory portion and causing the telephone number of the destination in the memory portion to be called via the second network before the VPN link is established in the first network,
the response detection portion of the source authenticates the destination by the response from the destination,
when a call arrives from the source via the second network, the incoming call portion of the destination references the memory portion of the destination, and on the condition that the call matches the telephone number of the source stored in the memory portion, authenticates the source, and after the authentication is completed by the source and the destination for each other, the confidential-communication preparation portion of the communication control device at each of the source and the destination causes the negotiation portion to exchange the VPN connection information via the second network and prompts the communication control device at the source to start the confidential communication by the switching portion via the first network.

5. The confidential-communication system using a VPN according to claim 1, wherein
the VPN connection information includes a parameter to be used in the confidential communication.

6. The confidential-communication system using a VPN according to claim 1, wherein
the communication control device includes a router portion for routing in the first network.

7. A confidential communication device using a Virtual Private Network (VPN) used as the communication control device in the confidential-communication system according to claim 1, the device comprising:
a wide area network interface;
an voice communication network interface;
the memory portion for storing the specific information;
the send/receive-processing portion;
the confidential-communication preparation portion; and
the switching portion, wherein
the wide area network interface is capable of connecting with the first network via a terminating device,
the voice communication network interface is capable of connecting with the second network via a portable terminal,
the send/receive-processing portion causes the P2P connection to be established between the respective communication control devices by collating with the specific information in the memory portion before confidential communication using a VPN via the first network starts, the user authentication including establishment of the P2P connection as an authentication factor,
the confidential-communication preparation portion exchanges the VPN connection information between the communication control devices via the second network, and
the switching portion starts the confidential communication using the VPN over the first network by a communication method based on the VPN connection information exchanged via the second network.

8. The confidential communication device using a VPN according to claim 7, comprising:
a router portion for routing in the first network; and
a portable terminal that is attached to the voice communication network interface.

9. A confidential-communication method using a Virtual Private Network (VPN) for performing a confidential communication between terminals of a plurality of users by authenticating the users before exchanging VPN connection information, the users using a wide area network such as the Internet, the method comprising:
using a first network that is the wide area network and a second network that is a wireless or wired Peer to Peer (P2P) network, wherein the second network is a voice communication network;
providing a communication control device for the terminal of each of the users, the communication control device being configured to enable communication via the second network by using a modem;
using a communication control device including a memory portion for storing specific information which can specify another party of the P2P connection, a send/receive-processing portion, a confidential-communication preparation portion, and a switching portion for the communication control device;
causing the send/receive-processing portion to establish the P2P connection between the respective communication control devices by causing the send/receive-processing portion to reference the specific information in the memory portion before confidential communication using the VPN over the first network starts, the user authentication including establishment of the P2P connection as an authentication factor,
causing the confidential-communication preparation portion to exchange the VPN connection information between the communication control devices by the P2P connection via the second network, the VPN connection information being required to establish a VPN link in the first network and including at least an encryption method, an encryption key, and a global IP address; and
causing the switching portion to start the confidential communication using the VPN over the first network by a communication method based on the VPN connection information exchanged via the second network.

10. A non-transitory computer-readable storage device having a confidential-communication program using a Virtual Private Network (VPN), embedded thereon executed by a computer processor, for realizing a confidential communication between terminals of a plurality of users by authenticating the users before exchanging VPN connection information, the users using a wide area network such as the Internet, wherein
the program is for enabling the confidential communication by using a first network that is the wide area network and a second network that is a wireless or wired Peer to Peer (P2P) network when the program is installed on the terminal of each of the users or a communication control device provided on the terminal, wherein the second network is a voice communication network, and the communication control device is configured to enable communication via the second network by using a modem, and
for constructing a memory portion for storing specific information which can specify another party of the P2P connection, a send/receive-processing portion, a confidential-communication preparation portion, and a switching portion when the program is installed on the terminal of each of the users or the communication control device provided on the terminal, wherein
the send/receive-processing portion causes the P2P connection to be established between the respective communication control devices by referencing the specific information before the confidential communication using the VPN over the first network starts,
the user authentication includes establishment of the P2P connection as an authentication factor,
the confidential-communication preparation portion exchanges the VPN connection information between the communication control devices by the P2P connection via the second network, the VPN connection information being required to establish a VPN link in the first network and including at least an encryption method, an encryption key, and a global IP address, and the switching portion starts the confidential communication using the VPN over the first network by a communication method based on the VPN connection information exchanged over the second network.

* * * * *